June 17, 1924.
A. C. ALBAUGH
1,498,062
PIPE LAYING MACHINE
Filed March 2, 1922
2 Sheets-Sheet 1
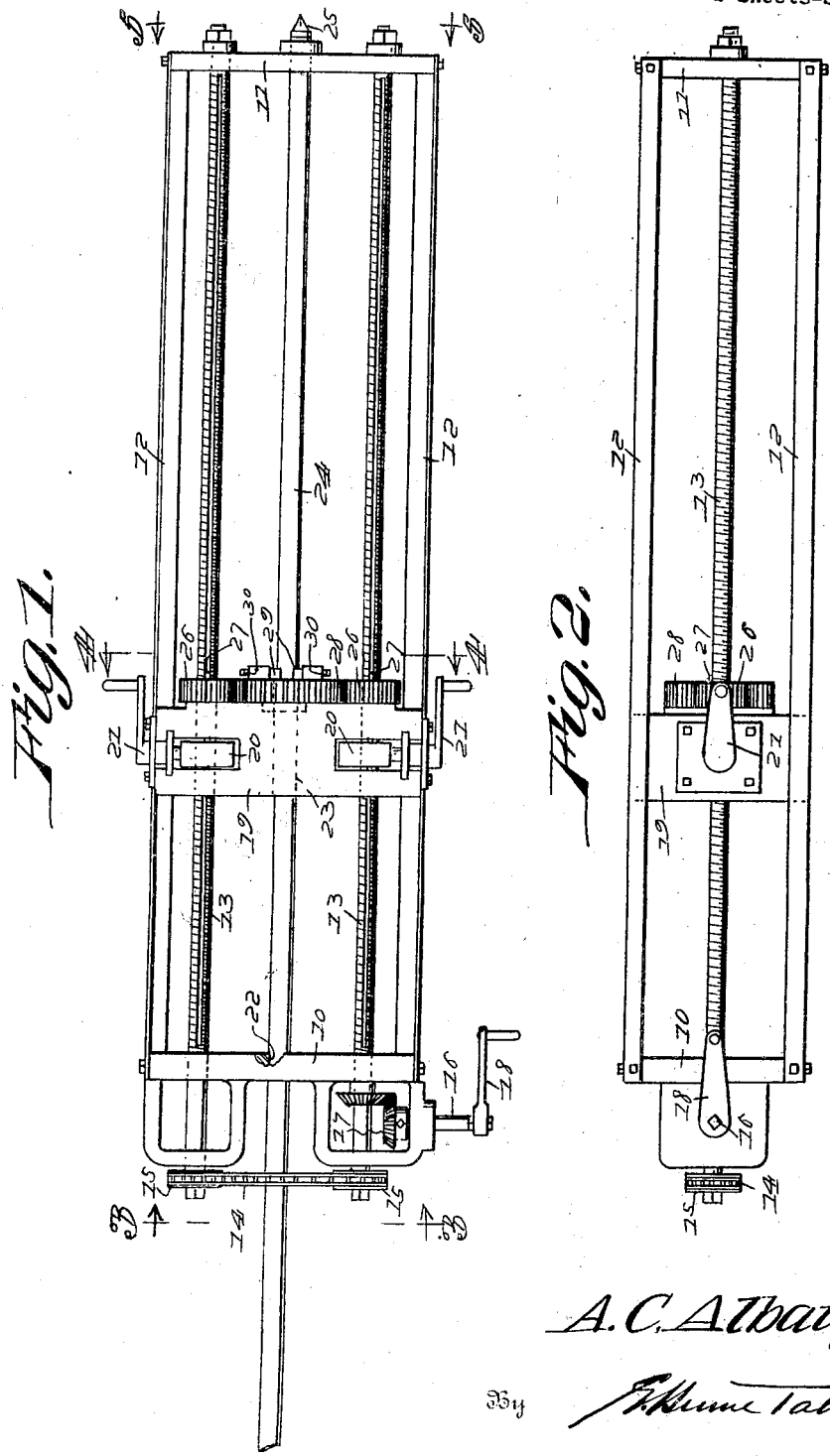
Inventor
A. C. Albaugh,
By
Attorney

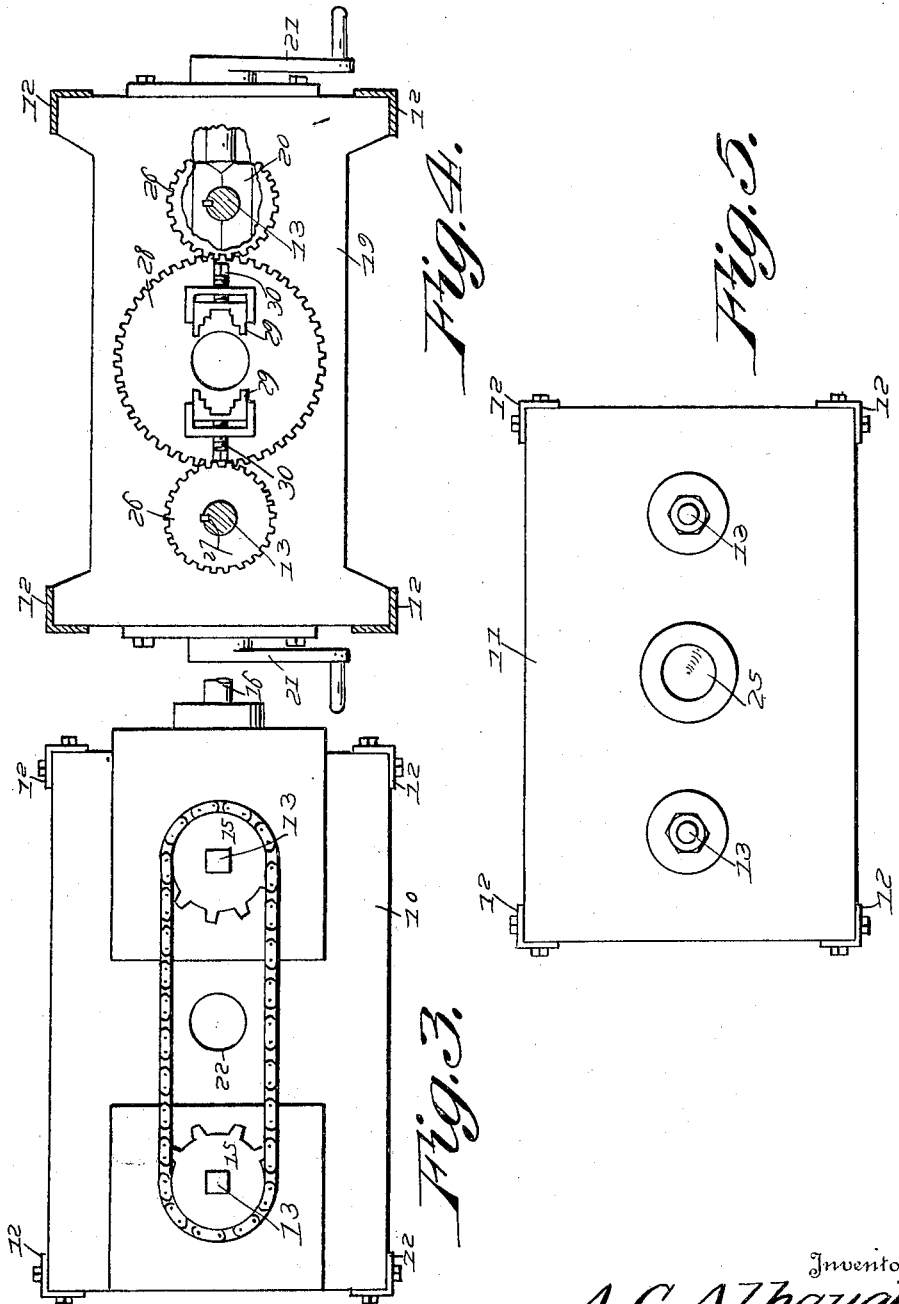

Patented June 17, 1924.

1,498,062

UNITED STATES PATENT OFFICE.

AMMIEL C. ALBAUGH, OF BOWLING GREEN, OHIO.

PIPE-LAYING MACHINE.

Application filed March 2, 1922. Serial No. 540,469.

*To all whom it may concern:*

Be it known that AMMIEL C. ALBAUGH, a citizen of the United States of America, residing at Bowling Green, in the county of Wood and State of Ohio, has invented new and useful Improvements in Pipe-Laying Machines, of which the following is a specification.

The object of the invention is to provide a simple, inexpensive and efficient means for laying house service pipes and the like as for example from the main line to the interior of the building without necessitating excavation from the line or vertical plane of the main to the wall of the building and hence the expense, inconvenience and interruption to traffic entailed by such work; and more particularly to provide a mechanism whereby a requisite length of tubing to form a house service connection with the main whether for gas, water or any equivalent thereof may be forced through the soil from the plane of the main to the interior of the building or in the reverse direction; and with this object in view the invention consists in a construction and combination of parts of which a preferred embodiment is shown in the accompanying drawings, wherein;—

Figure 1 is a plan view of an apparatus embodying the invention.

Figure 2 is a side view of the same.

Figures 3, 4 and 5 are transverse views taken respectively on the planes indicated by the lines 3—3, 4—4 and 5—5 of Figure 1.

The apparatus embodies essentially a main frame having terminal heads 10 and 11 connected by side bars 12 of angle iron or the equivalent thereof in the heads of which are revolubly mounted the peripheral feed screws 13 connected for simultaneous rotary movement in a common direction as by a sprocket chain 14 traversing sprocket wheels 15 secured to the ends of said screws and adapted for protection by any suitable means either manual or power such as a drive shaft 16 connected by intermeshing gears 17 with one of the feed screws and a crank 18.

Mounted on the guides afforded by the side bars of the frame is a cross head 19 movable longitudinally of the frame and adapted to be fed by the screws 13 through the feed nuts 20 which are of a split construction as shown in Figure 4 adapted to be engaged with or disengaged from the feed screws by means of cranks 21, so that whereas the cross head may be advanced during its operative stroke from one end of the frame to the other by means of the feed screws actuated through the drive shaft 16, the feed nuts may be spread or opened to permit of the return movement of the cross head merely by pressure applied thereto and without reference to the operation of the feed screws, to avoid the loss of time incident to reversing the direction of movement of the feed screws.

Formed in the terminal heads of the frame and in the cross head are aligned guide openings 22 and 23 for the reception of a service pipe 24 which is to be extended or laid, the forward end of the section of tubing preferably being fitted with a tapered or pointed plug 25 to facilitate the penetration of the soil and prevent dirt from being jammed thereinto.

Carried by the cross head and revolubly mounted thereon are pinions 26 fitted respectively on the feed screws and keyed thereto as shown at 27 so that the rotation of the feed screws will cause a corresponding rotary movement of the pinions as the cross head advances from one end of the frame toward the other, and mounted in coaxial relation with the guide opening 23 in the cross head is a gear 28 meshing with the pinions 26 and carrying the jaws 29 of a clamp for engaging the pipe 24, said jaws being actuable by set screws 30 which may be turned by a suitable wrench or the equivalent thereof. Various diameters of pipes may be accommodated in the guide openings provided therefor and correspondingly may be engaged by the clamp 29, and having closed the feed nuts with the cross head at one end of the frame and engaged the pipe by the closing of the jaws 29 it is obvious that the operation of the drive shaft 16 will cause the advance of the cross head and the penetration of the pointed head of the pipe into the soil. Should the single operation limited by the length of the frame be insufficient to advance the pipe to the required extent it is equally obvious that the clamp 29 may be released and the feed nuts opened to permit of the return of the cross head to its initial position for a succeeding stroke which obviously may be repeated as frequently as necessary to effect the desired object.

Having described the invention, what is claimed as new and useful is:

A pipe laying machine comprising a frame, a cross head mounted for movement along the frame, parallel feed screws journaled at the opposite sides of the frame, means for rotating said screws simultaneously, means for rotating one of the screws, the frame being provided at its ends and the cross head at a point between its ends with openings adapted to receive the pipe, pinions slidably mounted upon the screws, a gear wheel journaled upon the cross head and having a central opening adapted to receive the pipe, said gear wheel meshing with said pinions, pipe clamping means mounted upon the gear wheel, feed nuts carried by the cross head and consisting of sections movably mounted with relation to each other and engageable with threads of the screws, and manually operable means for moving the sections of the nuts with relation to each other, whereby the threads of the nuts may be disengaged from the threads of the screws and the cross head may be moved in either of two directions with relation to the screws.

In testimony whereof he affixes his signature.

AMMIEL C. ALBAUGH.